C. PALMER.
R. BRIDEN, RECEIVER.
CASH REGISTER.
APPLICATION FILED SEPT. 26, 1910.

1,118,147.

Patented Nov. 24, 1914.
6 SHEETS—SHEET 4.

WITNESSES:
H. F. Sadgebury
W. M. McCartley

INVENTOR
Robert Briden, Receiver
for Charles Palmer
BY W. H. Muzzy
and Rables
ATTORNEYS.

C. PALMER.
R. BRIDEN, RECEIVER.
CASH REGISTER.
APPLICATION FILED SEPT. 26, 1910.

1,118,147.

Patented Nov. 24, 1914.
6 SHEETS—SHEET 6.

UNITED STATES PATENT OFFICE.

CHARLES PALMER, OF CATFORD, ENGLAND, BY ROBERT BRIDEN, OF LONDON, ENGLAND, RECEIVER IN LUNACY OF SAID PALMER, ASSIGNOR, BY MESNE ASSIGNMENTS, TO THE NATIONAL CASH REGISTER COMPANY, OF DAYTON, OHIO, A CORPORATION OF OHIO.

CASH-REGISTER.

1,118,147.  Specification of Letters Patent.  Patented Nov. 24, 1914.

Application filed September 26, 1910. Serial No. 583,922.

*To all whom it may concern:*

Be it known that I, ROBERT BRIDEN, a subject of the King of Great Britain and Ireland, residing at London, in England, am the receiver in lunacy of CHARLES PALMER, as appears by a certified copy of my appointment, which has been recorded in the assignment records of the Patent Office in Liber E 87, page 355, who has invented certain new and useful Improvements in Cash-Registers, of which I declare the following to be a full, clear, and exact description.

This invention relates to cash registers and more particularly to the type of machine shown in patent granted to Cleal and Reinhard, No. 580,378, April 13th, 1897.

There is considerable demand for a small sized machine, that is, one of two or three banks of keys, that will perform all the functions of the type of machine shown in the above mentioned patent, but owing to the wide separation of the movable elements of the totalizing mechanism of said patent, such a small machine has so far been impracticable and the principal object of this invention is to provide the patented type of machine with a compact totalizing mechanism so that the total registering capacity may be greatly increased.

Another object of this invention is to provide such a type of machine with mechanism for operating a totalizing mechanism of the type shown in the patent granted to Thomas Carney, No. 497,860, May 23rd, 1893, so that the parts of these machines, which are in extensive use, may become interchangeable, that is as far as the totalizing mechanism is concerned.

Another object of this invention is to provide special counters which register the number of special transactions entered in the machine.

Another object of this invention is to provide an improved form of indicating mechanism.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1:
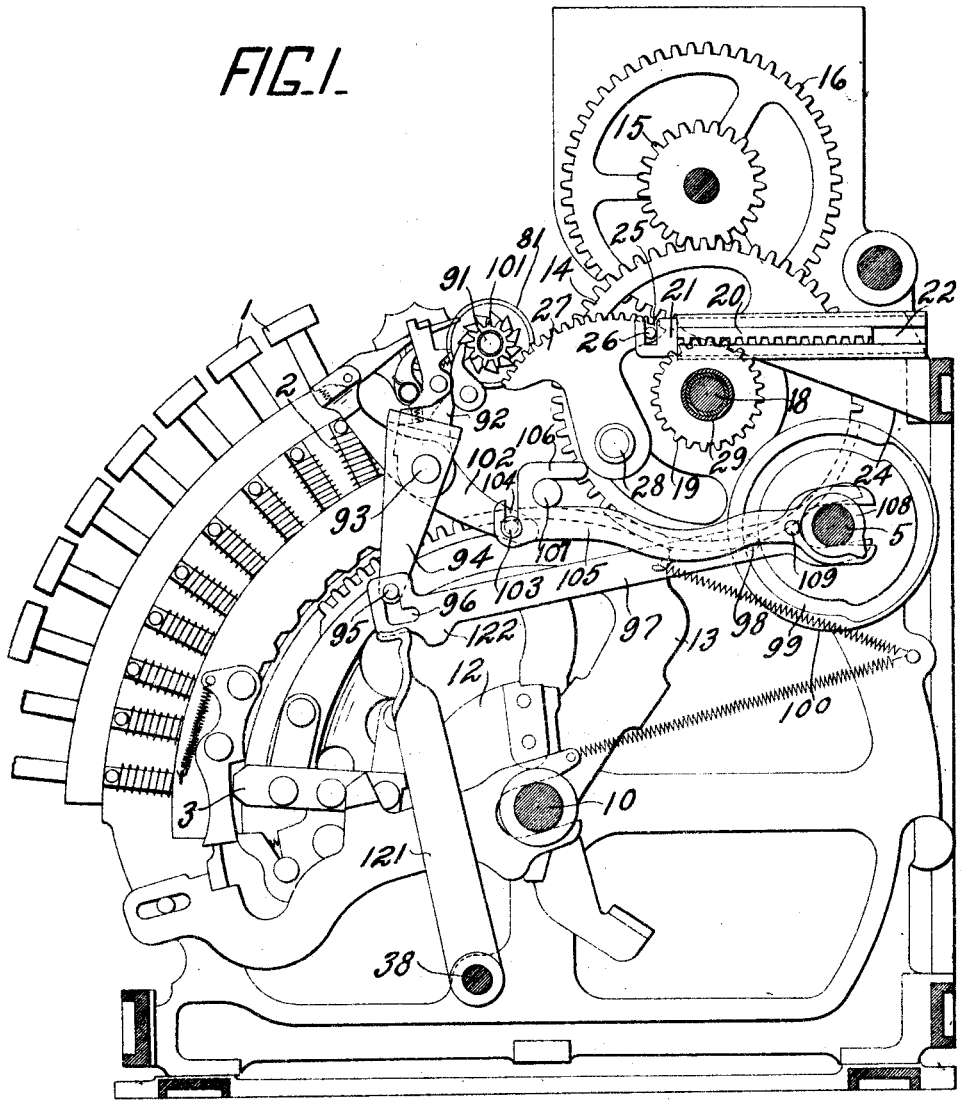
Figure 2:
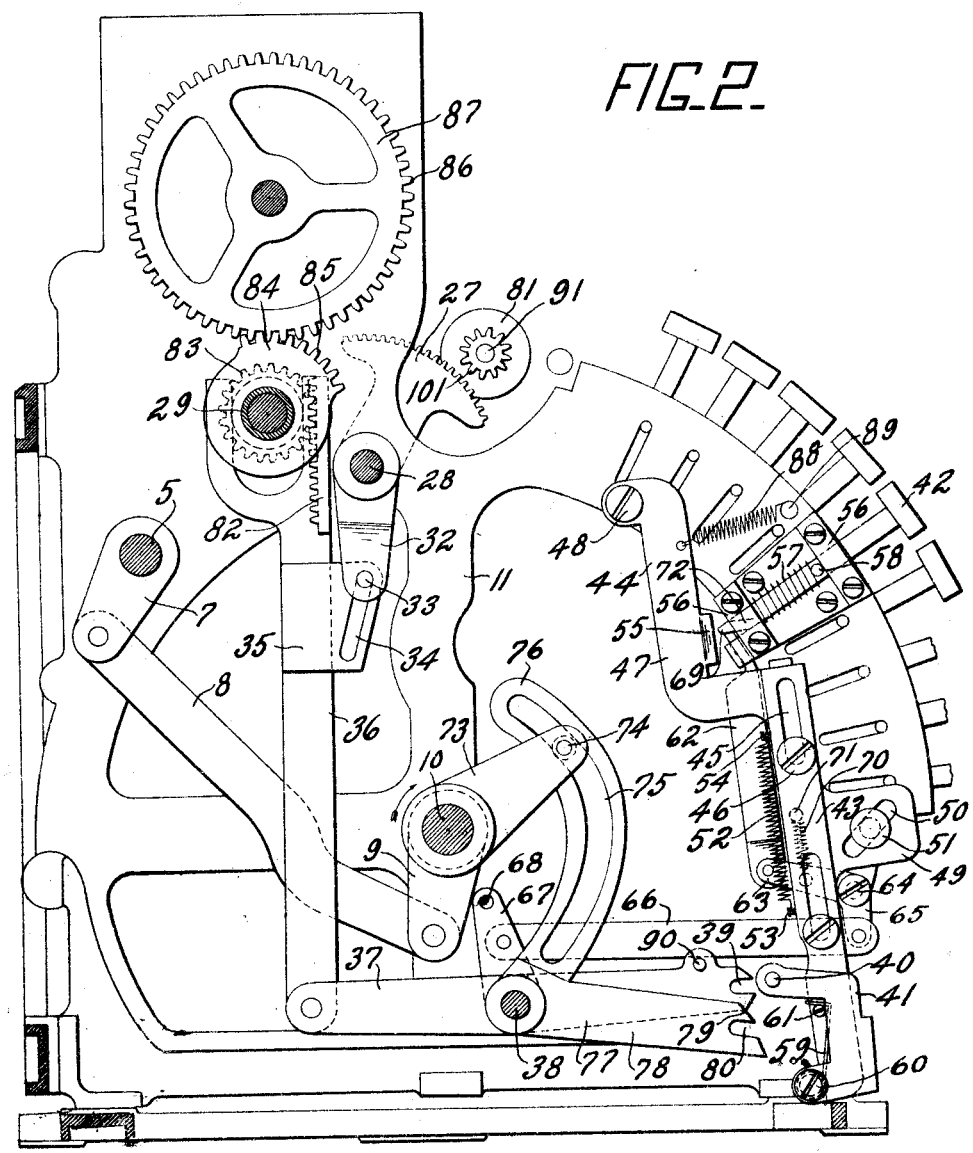
Figure 3:
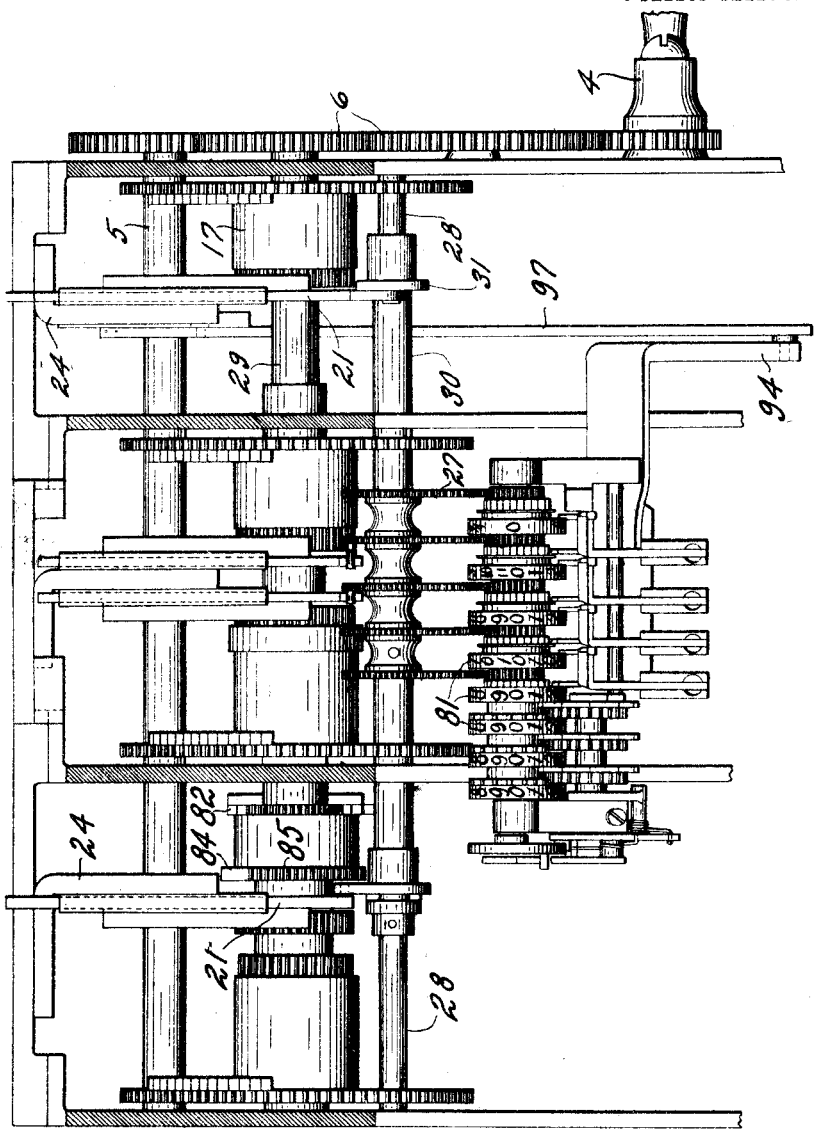
Figure 4:
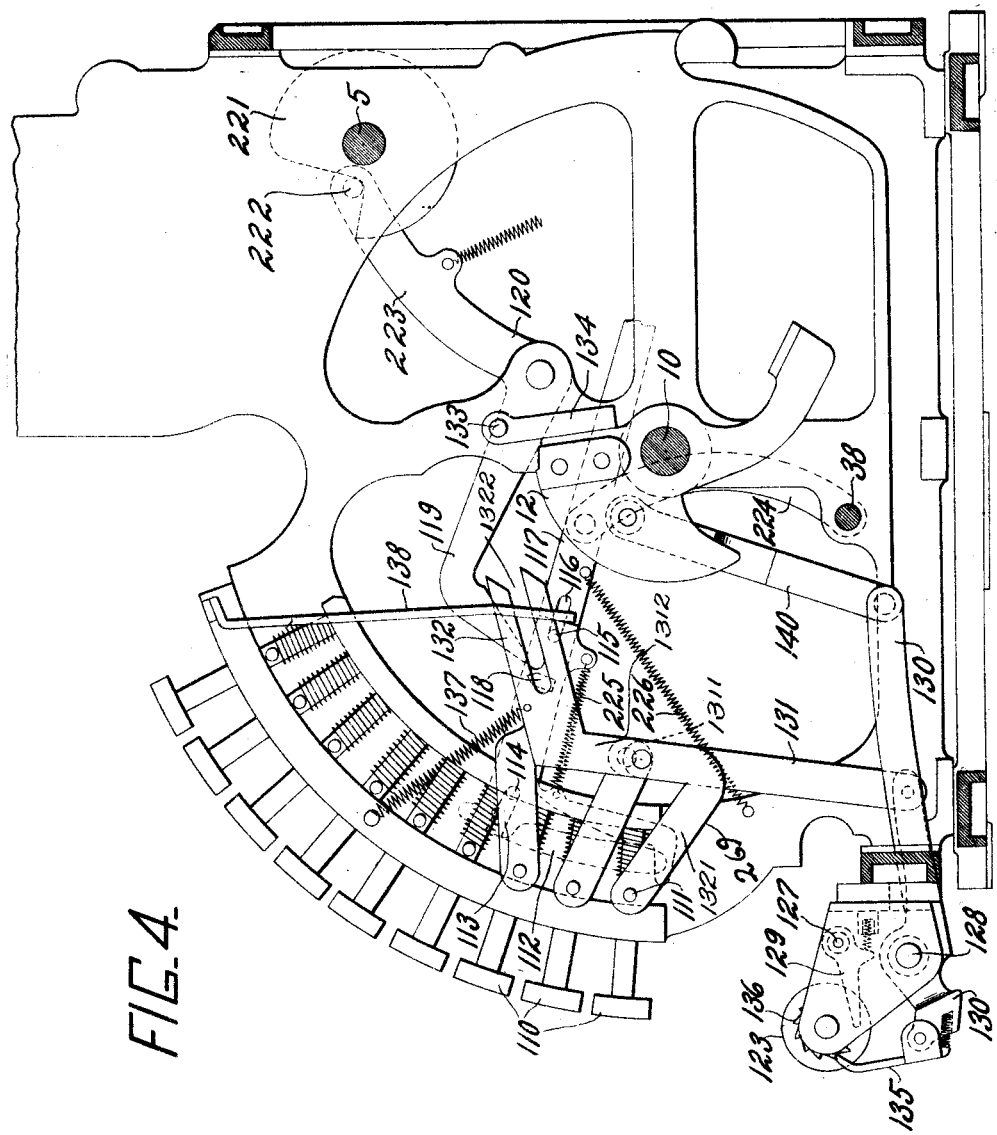
Figure 5:
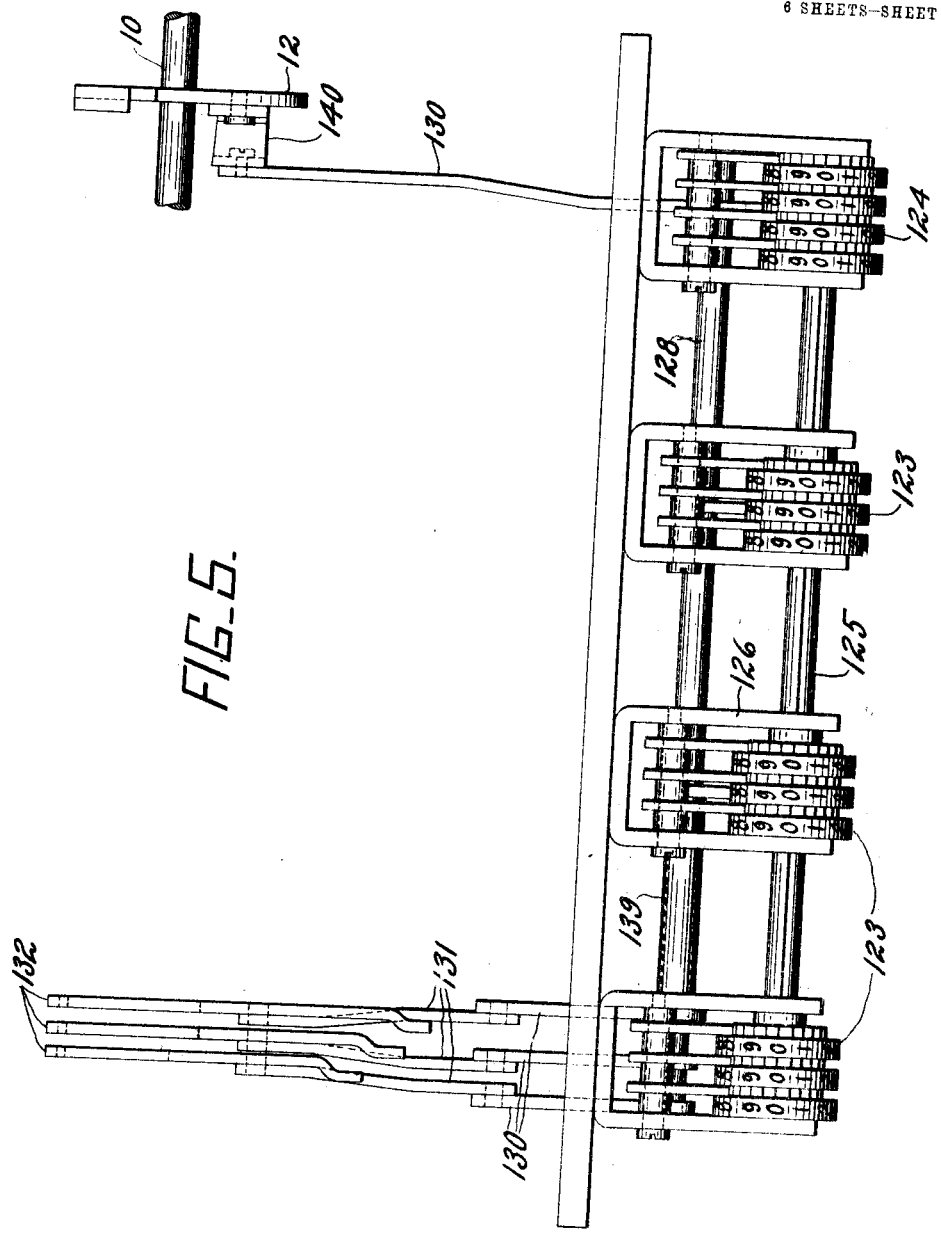
Figure 6:
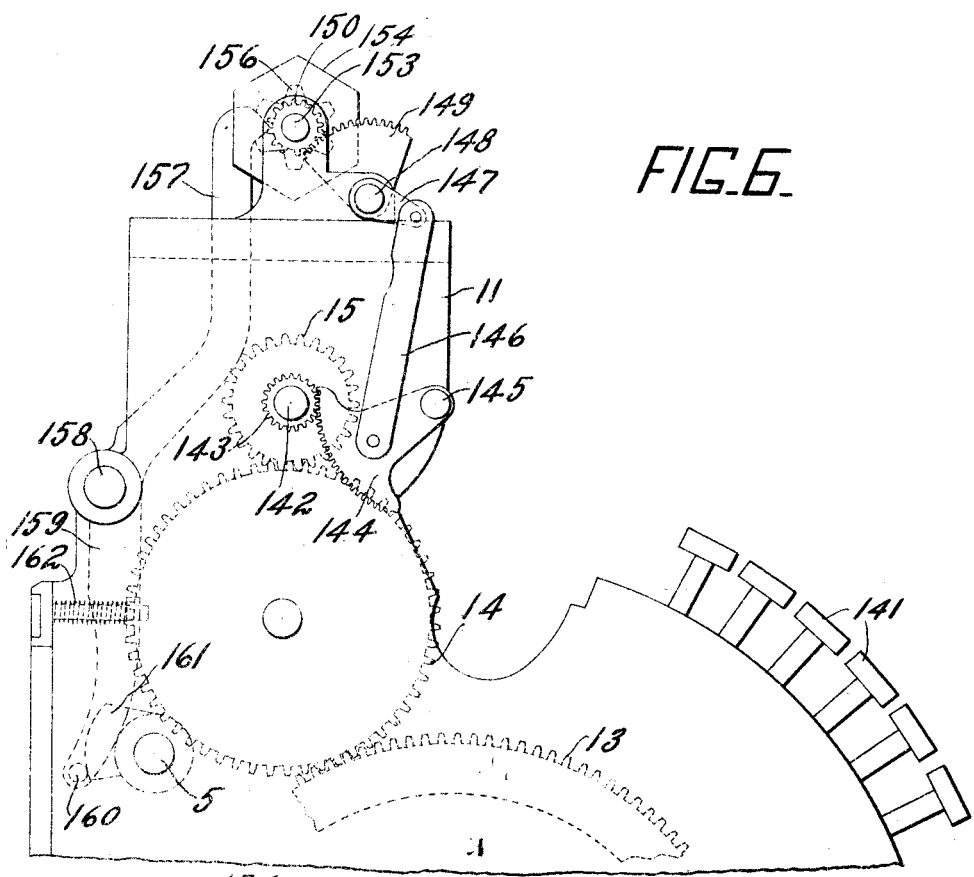
Figure 7:
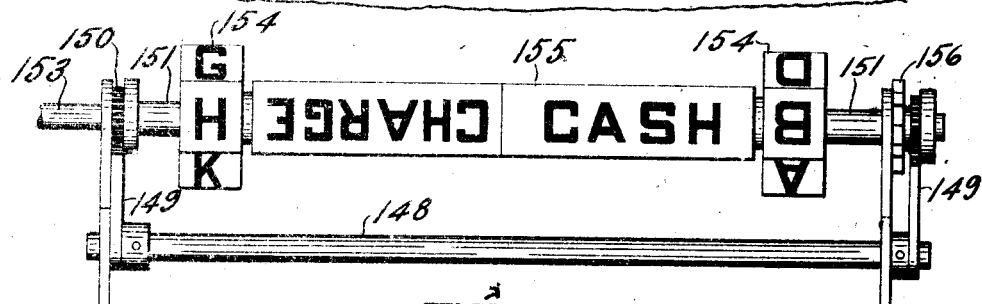

Figure 1 is a central transverse sectional view through a machine of the type shown in the Cleal and Reinhard patent with the improvements applied thereto. Fig. 2 is a central transverse sectional view through the machine showing the connecting mechanism for the tens of shillings actuating mechanism. Fig. 3 is a partial top plan view of the totalizing mechanism and its coacting parts. Fig. 4 is a transverse sectional view taken alongside of the bank of special keys, and showing the actuating mechanism for the special counters. Fig. 5 is a top plan view of the special counters and actuating devices therefor. Fig. 6 is a side elevation of the clerk's indicator and actuating devices therefor. Fig. 7 is a partial front elevation of the clerk's and special transaction indicators.

Described in general terms the machine comprises a series of banks of manipulative devices, such as keys, which determine the movement of oscillatory segments which are actuated upon the rotation of an operative crank handle. These segments mesh with intermediate gears which in turn mesh with pinions secured to indicators, to indicate the amount represented by the operated manipulative devices or keys. Connected to the intermediate gears are pinions which mesh with racks, the latter in turn being connected to registering segments. Previous to the movement of these registering segments, totalizing elements mounted in a rock frame are carried into engagement with said segments, so as to have the movements of the segments imparted to the elements of the totalizing mechanism. At the beginning of the operation of the machine, the registering segments are positively returned to normal or zero position with the indicators, the totalizing elements in the meantime being disconnected from said segments. Keys representing special transactions are provided, and upon the operation of any of these keys and the turning of the crank handle, the totalizing mechanism will be held out of engagement with the registering segments, so that while the transaction will be indicated and recorded, it will not be registered upon the elements of the totalizer.

Special counters are provided to register the number of these special transactions that are entered in the machine, these counters being controlled by the special keys. Mounted above the amount indicators is an indicator for displaying the kind of transaction that is entered in the machine and adjacent to said indicator are indicators for displaying, at the front and back of the machine, the initial of the clerk making the transaction.

The improvements have been shown applied to a machine employing the English monetary system, but it is to be understood that this type of machine has been used simply for the sake of illustration and that any other monetary system may be employed.

The manipulative devices or keys 1 are held in their outermost position by springs 2 coiled around the shanks of said keys. Upon depressing any one of these keys its inner end will project into the path of a pawl forming a part of a latching mechanism 3 attached to the differentially movable segment 13 of that particular bank of keys. Upon the operation of a crank handle 4, see Fig. 3, a main operating shaft 5 will be rotated through suitable intervening gears 6. This shaft 5, see Fig. 2, is provided with an arm 7 to which is secured one end of a link 8, the other end of said link being secured to an arm 9 fast upon a shaft 10 which is suitably supported in the frame work 11 of the machine. As the shaft 5 rotates in the direction of the arrow shown in Fig. 2, the shaft 10 will rock first in one direction and then in the opposite direction. This rock shaft 10 carries fast thereon segments 12, see Fig. 1, one for each bank of keys. When a key is depressed the segment 12 corresponding to that bank will engage with part of the latching mechanism 3 upon the return of said segment and carry the corresponding differential segment or actuator 13 with it until the pawl of the latching mechanism 3 contacts with the inner end of the depressed key, at which time the latching mechanism will be disengaged from its segment 12 so as to permit the latter to complete its movement. Each of the segments 13 engages with an intermediate gear 14, which in turn meshes with a pinion 15 suitably secured to an amount indicator 16. From this it will be seen that the differential movement of a segment 13 as controlled by its amount keys, will be imparted to its indicator 16 through the gearing just described. All of this mechanism is fully shown and described in the above mentioned Cleal and Reinhard patent and for a full detailed description thereof reference may be had to said patent.

The intermediate gears 14 are attached to hubs 17, see Fig. 3, which surround a horizontal shaft 18. Secured to one end of each of these hubs 17 is a pinion 19 which meshes with a rack 20 projecting from the side of a slide 21 and through a slot 22 formed in a guide 23 for said slide. These guides, of which there is one for each amount bank of keys, are supported by brackets 24, which in turn are suitably secured to the frame work of the machine. The forward end of each of these slides 21 is provided with a recess 25 into which projects a pin 26 extending from the registering segments or actuating devices 27 which are loosely mounted upon a shaft 28, the latter being supported in the side frames 11 of the machine. The intermediate gears 14 and hubs 17 are secured to the inner ends of nested sleeves 29 which surround the shaft 18, and which at their outer ends have type carriers secured thereto as fully shown in the aforesaid Cleal and Reinhard patent.

It has been stated that each of the slides 21 is connected to its registering segment by a pin 26 extending from said segment frame but this is not quite true of the farthings segment. This segment is attached to one end of a sleeve 30, (Fig. 3), which surrounds the shaft 28, the other end of said sleeve having secured thereto an arm 31, to the upper end of which is attached the farthings slide 21. The pounds actuating segment 27 is connected to its slide 21 in a manner similar to the farthings actuating segment, while the actuating segment 27 for the tens of shillings is operated in a somewhat different manner which will now be described. This segment 27 is mounted rigidly upon the shaft 28 and the latter has extending downwardly therefrom an arm 32 which is provided with a pin 33 at its lower end. This pin 33 extends into a vertical slot 34 of a plate 35, which is fastened to an upright arm 36, the lower end of this arm being secured to the rear end of a lever 37 which is centrally pivoted upon a shaft 38 mounted in the frame work 11 of the machine. The forward end of the lever 37 is provided with a recess 39 into which a pin 40 projecting from a snap pawl 41 is arranged to be moved by the ten shillings key 42. This snap pawl 41 is pivotally secured to the lower end of a slide 43 which forms one member of a connecting or coupling device 44. This slide 43 is provided with elongated slots 45 through which project guide pins 46 extending from an arm 47 which is pivoted as at 48 to one of the frames of the machine. This arm 47 forms the other member of the coupling device and has extending forwardly from near its lower end an ear 49 which is provided with a slot 50 through which a guide pin 51 extends into the frame of the machine, this slot 50 and pin 51 acting as a guide for the lower end of the arm 47. The slide 43 is held in the position shown in Fig. 2 with the lower ends of slots 45 in contact with the shanks of the pins 46 by a spring 52, the ends of which are secured to pins 53 and 54 which respectively extend from the slide 43 and the arm 47. A flange 55 extends laterally from the arm 47 into the path of the inner end of the ten shillings key 42, this latter key being supported and guided between the units of shillings and the pounds banks of keys by plates 56. A spring 57 surrounds the shank of the key 42, the ends of said spring 57 contacting with the inner one of the plates 56 and with a pin 58, extending from said key 42, thereby holding said key in its outer position.

Upon the depression of the key 42, the inner end of said key will contact with the flange 55 and rock the arm 47 about its pivotal point 48 thereby moving the slide 43, carried by the arm 47, rearwardly. This rearward movement of the coupling device will carry the pin 40 of the snap pawl 41 into the slot 39 formed in the forward end of the lever 37. A coiled spring 59 surrounds the pivotal point 60 of the pawl 41 with the ends of said spring contacting with the underside of said pawl and the rear side of the slide 43, thereby holding the rear side of the pawl in contact with a pin 61, projecting from the slide 43. The key 42 is held in its depressed position and the coupling device 44 in its adjusted position by a slide 62, the upper end of which is guided by one of the plates 56, the lower end of said slide being pivoted to the rear end of a horizontal arm 63 of a bell crank which is pivoted as at 64 to the frame of the machine. The downwardly extending arm 65 of the bell crank is pivoted at its lower end to the forward end of a link 66, the rear end of which is fast to an arm 67, the latter being pivoted upon the shaft 38, and provided at its upper end with a laterally extending pin 68. As will be seen from Fig. 2, upon the depression of the key 42, the latching slide 62 will be depressed by a beveled portion 69 formed upon the inner end of said key, contacting with the upper end of said slide, and when said key is fully depressed, the slide 62 will be elevated by a spring 70, the ends of which are secured to the horizontal arm 63 of the bell crank and to a pin 71 projecting from one of the frames of the machine. This elevation of the slide 62 when the key 42 is depressed will result in the upper end of said slide passing into a recess 72 formed in the side of the shank of the key 42, thereby holding said key depressed.

Upon the beginning of the rotation of the crank handle 4, the shaft 10 will be rocked in the direction of the arrow, (Fig. 2), and thereby carry an arm 73, secured to said shaft, downwardly. The forward end of this arm is provided with a pin 74 which plays in a slot 75 formed in the vertical arm 76 of a bell crank arm 77 which is pivoted upon the shaft 38 and rocks said lever counter-clockwise. This movement of the lever 77 will elevate the forward end of the horizontal arm 78 of said bell crank and as said arm is elevated, a beveled end 79 formed on the forward end of the arm 78, will contact with the pin 40 of the snap pawl 41 and force the pin 40 out of the recess 39 formed in the forward end of the lever 37, and as the beveled end 79 of the arm 78 passes above the pin 40, the latter will spring back into the recess 39 and also into a recess 80, formed in the forward end of the horizontal arm 78, thereby coupling said arm to the lever 37. As the rock shaft 10 is returned to its normal position during the latter half of the rotation of the shaft 5, the pin 74 on the arm 73 will rock the bell crank 77 clockwise, thereby carrying the pawl 41 and the slide 43 to which it is pivoted downwardly, slide 43 being capable of movement independent of the arm 47 by the slots 45 and pins 46. This downward movement of the pawl 41, by the pin 40, rocks the lever 37 about the shaft 38. This rocking downwardly of the forward end of the lever 37 will carry the rear end of said lever upwardly, which movement will be transferred to the arm 36, and by the inclined slot 34 formed in the plate 35 secured to this arm, rock the ten shillings actuating segment 27 about the rod 28 and thereby actuate the corresponding registering element 81 of the totalizer, which, as hereafter described, has been previously rocked into engagement with the segments 27.

The upper end of the arm 36 is forked and straddles the nested sleeves 29. The forward edge of this forked end of the lever 36 has attached thereto a rack plate 82 which meshes with a pinion 83 suitably secured to one of the nested sleeves 29, so as to set up its corresponding type carrier. Attached to this pinion 83 is a plate 84, a portion of the periphery of which is provided with teeth 85 which mesh with a gear wheel 86 secured to the ten shillings indicator 87 and thereby bring the ten shillings character into position to be displayed when the arm 36 is elevated as previously described. Suitable devices are provided for alining the amount indicators, which devices are fully shown and described in the aforesaid Cleal and Reinhard patent.

By the rotation of the shaft 5, the arm 9 secured to the shaft 10 will first be rocked in the direction of the arrow shown in Fig. 2, and then back slightly beyond the position shown in said figure, and finally back to its normal position. This additional forward movement of the arm 9 will result in its contacting with the pin 68 carried by the arm 67 and rocking said arm. This rocking of the arm 67 will rock the bell crank, composed of the arm 63 and 65, counter clockwise thereby withdrawing the upper end of the latch slide 62 from the recess 72 of the ten shillings key 42, permitting the said key to be returned to its normal outer position by its spring 57. This movement of the key 42 to its normal position permits the return of the coupling device 44 to its normal position by a spring 88, one end of which is fast to the arm 47, and the other end to a pin 89 projecting from one of the frames of the machine. When the arm 47, of the coupling devices 44, is returned to its normal position by its spring 88, the slide 43 carried by said arm will also be returned to its normal position by the spring 52. Upon the succeeding operation of the machine after the ten shillings mechanism described above has been operated, the lever 37 and its connected parts are returned to their normal position as shown in Fig. 2, by the upper edge of the horizontal arm 78, of the bell crank 77, contacting with a pin 90 projecting from the forward end of the lever 37, it being understood that the bell crank 77 is rocked at each operation of the machine and only coupled to the lever 37 when the tens shillings key 42 is depressed.

The registering elements 81 of the totalizer are normally out of operative relation with the actuating segments 27 and are mounted upon a shaft 91, see Fig. 1, which is supported by a totalizer frame 92. This frame is pivoted as at 93 between two of the machine frames, and has extending therefrom an arm 94 which is provided with a pin 95 that extends in the upper end of a vertical portion of an L shaped slot 96 formed in the forward end of a link 97. This link 97 at its rear end is forked and straddles the shaft 5, this link being provided near its rear end with a pin 98 which plays in a cam groove 99 formed in a disk 100 secured to the shaft 5. The shape of the groove 99 of the disk 100 is such that pinions 101 secured to the wheels or totalizer elements 81 will be rocked into engagement with the actuating segments previous to the registering movement of the latter and are held in such engagement during the movement of said segments, after which the pinions 101 will be rocked out of engagement to permit of an independent movement of the totalizing elements by transfer pawls 102 which are pivotally mounted in the totalizer frame 92 in the same horizontal plane as the frame itself. The downwardly and rearwardly extending portions of the pawls 102 are provided with pins 103 which project into recesses 104 formed in the forward end of links 105. Near their forward ends these links 105 are provided with upwardly and rearwardly extending portions 106 which extend over a transverse rod 107 and are supported thereby, the rear ends of the links 105 being forked so as to straddle the shaft 5. Adjacent to these forked ends of the links 105 are cams 108 which are arranged to engage with pins 109 projecting from the links 105 when the elements 81 of the totalizer are out of engagement with the actuating racks 27, so as to operate the pawls 102 to turn in a transfer, if said pawls have previously been tripped by their registering elements, as is well known in the art and fully shown and described in the said Carney patent previously mentioned. It is to be understood that the cams 108, only one of which is shown, are arranged upon the shaft 5 so as successively to operate the transfer pawls 102, and that while transfers from one denomination to another in most cases occur at each complete rotation only of a pinion, there is an exception in that the tens of shillings pinion is constructed to trip its transfer pawl at every second unit of its movement, it bearing alternately the characters 1 and 0 and carrying the required number of tripping lugs such as those shown in said Carney patent.

When special transactions such as " charge," " received on account " and " paid out " are to be entered in the machine, it is desirable to prevent the totalizer elements from engaging with the actuating racks 27, and to accomplish this object the following mechanism is provided. Referring to Fig. 4 the three lower keys 110 are used to designate such transactions. When any of these keys is operated its pin 111 will contact with the outer edge of a sliding plate 112 and force said plate rearwardly. At its forward end this plate 112 is provided with a recess 113 into which enters a pin 114 projecting from the side frame of the machine to guide the front end of said plate 112. The rear end of the plate 112 is provided with a pin 115 which plays in a slot 116 formed in a plate 117 mounted adjacent to the plate 112. The plate 117 is provided at its forward end with a recess similar to the recess 113 formed in the plate 112 and through which the pin 114 extends. The plate 112 carries a lug 118 which, when the plate 112 is forced rearwardly by the depressing of one of the special keys 110, will pass into the path of movement of the forward end 119 of a bell crank lever 120 which is pivoted to the side frame of the machine so that when said lever is rocked counter clockwise, as hereafter described, the slide 112 will be given an additional movement rearwardly, and, by its pin 115 contacting with the rear end of the slot 116 formed in the slide 117, will also move the latter slide rearwardly. The counter clockwise movement of the bell crank 120 to move the slides 112 and 117 rearwardly is imparted thereto by a cam disk 221 which engages with a roller 222 mounted in the upper end of the vertical arm 223 of the bell crank 120. The cam disk 221 is rigidly secured to the shaft 5 and upon the first part of the movement of said shaft the bell crank 120 will be rocked counter clockwise, and thereby impart an additional rearward movement to the slides 112 and 117, as previously described. The extreme rearward end of the slide 117 is connected to one of the feeding rollers (not shown) so as to render the feeding mechanism for the check strip, employed in this type of machine, operative. This construction is fully shown and described in Patent No. 654,226 issued to Thomas Carroll, July 24th, 1900, and for additional description of said slides and bell crank, reference may be had to said patent.

The upper end of a link 224 is secured to the slide 117 while the lower end of said link is fastened to the shaft 38. The other end of the shaft 38, see Fig. 1, is provided with an arm 121, the upper end of which, when the slide 117 is moved rearwardly by the bell crank 120, as previously described, will be rocked clockwise by the link 224 and shaft 38 and elevate the forward end of link 97 by contacting with an extension 122 projecting from the under side of the link 97, so as to bring the previously described pin 95 into the horizontal portion of the L shaped slot 96 formed in the link 97. In this position the link 97, when moved forwardly by its cam disk 100, will have no effect upon the totalizer frame 92, whereby the elements 81 of the totalizer will remain out of operative relation with the actuating segments 27. The slides 112 and 117 are held relatively to each other, as shown in Fig. 4, by a spring 225 and said slides are returned to normal position at the end of the operation of the machine by a spring 226, the ends of which are connected to the slide 117 and to a pin projecting from the side frame of the machine.

In order that an account of the number of special transactions entered in the machine may be kept special counters 123 are provided, and in order to keep an account of the total number of all kinds of transactions entered in the machine, a customer or total counter 124 is provided. These counters are mounted upon a shaft 125 which is supported by brackets 126 secured to the front tie bar of the machine. In the brackets 126 are mounted rods 127 for supporting retaining pawls 129 and extending through all the brackets 126 is a shaft 128 which support actuating pawl levers 130. These levers 130 have arms extending rearwardly to which are pivoted the lower ends of links 131, the upper ends of said links pivotally carrying at 1311 two armed members 1312 the forward arms 1321 of which pivotally connect with the key pins 111 of the corresponding special transaction keys 110. The rear arms 132 of the members 1312 are forked by slots 1322, which slots, when their corresponding special keys are depressed, are moved into the path of movement of a pin 133 extending from an arm 134 secured to the segment 12 coöperating with this particular bank of keys. Upon the operation of the machine, the said pin will pass into the forked end of the adjusted link 1312 and depress link 131. This rocking of the link 131 will rock the corresponding lever 130 so as to add one upon the special counter 123 by the actuating pawl 135 which engages with ratchet wheels 136 attached to the wheels of the counter. The ratchet pawls 129 prevent any retrograde movement of the counter wheels. Upon the return of the segment 12 carrying arm 134 and pin 133 to normal position, a spring 137 will return the link 131 and the pawl carrying lever 130 to their normal positions. It is to be understood that there is one of these springs 137 for each one of the links 131. A suitable plate 138 extends downwardly from one of the frames of the machine and acts as a guide for the links 131, the forked ends of said links passing through said plate 138. The upper one of the special keys 110 is connected by link 131 to the left hand lever 130 shown in Fig. 5, and this lever is loosely mounted upon the shaft 128 and carries the actuating pawl 135 for actuating the left hand special counter 123 shown in Fig. 5. The middle special key 110 is connected to the middle pawl lever 130, as shown in Fig. 5, by its link 131 and this pawl lever is fast to the shaft 128, and this shaft carries the actuating pawl 135 for actuating the second special counter 123 from the right as shown in said figure. The bottom special key 110 is connected by its link 131 to the right hand lever 130 and this lever is attached to one end of a sleeve 139 surrounding the shaft 128. The other end of this sleeve carries the actuating pawl 135 for actuating the second special counter 123 from the left, as shown in Fig. 5. The customer counter 124 is actuated by a pawl 135 carried by a pawl lever 130, the rearward arm of which is connected by a link 140 to one of the segments 12 secured to the rock shaft 10. From this description it will be seen that each of the special counters 123 will be actuated only when its key 110 is depressed, while the customer counter 124 will be actuated upon each operation of the machine.

In order to avoid confusion the clerk's indicator is located with the special transaction indicator, above the amount indicators, thereby preventing any possibility of mistaking the character designating the clerk for an amount, the operation of this indicator being as follows. The differentially movable segment 13, see Fig. 6, controlled by the clerks' keys 141 meshes with an intermediate gear 14, similarly to the amount segments 13, and this gear in turn meshes with a pinion 15 secured to a shaft 142. This shaft 142, on the outside of the left hand machine frame 11, is provided with a pinion 143 which meshes with a segment 144 suitably pivoted as at 145 on the left hand machine frame. This segment 144 has secured thereto one end of a link 146, the upper end of which is pivoted to a forwardly extending arm 147 which is fast to a transverse shaft 148 suitably secured in the machine frame. This shaft has secured thereto a segment 149 which meshes with a pinion 150 secured to one end of a sleeve 151, loosely mounted upon a transverse shaft 153, the other end of this sleeve 151 having secured thereto a hexagonal indicator 154 for indicating to the front of the machine. The shaft 148 extends to the right hand side of the machine, as shown in Fig. 7, and is provided with a similar segment 149 which meshes with pinion 150 secured to one end of a sleeve similar to sleeve 151, the other end of which has secured thereto an indicator 154 for displaying the characters designating the clerks to the rear of the machine. Attached to the right hand pinion 150 (Fig. 7) is a star shaped disk 156 with which an alining lever 157 engages so as properly to aline the indicators 154. This lever 157 is fast upon a shaft 158, projecting downwardly from which is an arm 159 carrying a roller 160 at its lower end. The shaft 5 is provided with a cam 161 which normally engages the roller 160 to hold the alining lever 157 in engagement with the disk 156 against the tension of a spring 162. Upon the first movement of the shaft 5 the cam 161 passes out of engagement with the arm 160, thereby permitting the spring 162 to force the arm 159 forwardly and withdraw the upper end of lever 157 from engagement with the star shaped disk 156, to permit the clerk's indicators to be adjusted. Between these clerk's indicators is mounted a special transaction indicator 155 which is connected to the shaft 153 and operated in a manner substantially similar to that shown in Patent No. 897,575 granted to F. H. Bickford, Sept. 1, 1908.

The equipment of the type of the machine shown in the aforementioned Cleal and Reinhard patent with the totalizing mechanism of the Carney patent is not broadly new in this application, it being described and claimed in a copending application Serial No. 552,047, filed March 28, 1910, by the present applicant, and all claims to subject matter common to both applications, are to be embodied in the earlier application.

While the form of mechanism shown herewith and described is admirably adapted to fulfil the objects primarily stated it is to be understood that it is not intended to confine the invention to the one form of embodiment herein shown and described as it is susceptible of embodiment in various forms all coming within the scope of the claims which follow.

I claim—

1. In a cash register, the combination with a registering element, of actuating mechanism therefor, operating means for said actuating mechanism normally disconnected therefrom, a movable device comprising two members for connecting the actuating mechanism and the operating means, one member of said connecting device being movable independently of the other, and a manipulative device controlling the movement of said device into connecting position.

2. In a cash register, the combination with a registering element, of actuating mechanism therefor, operating means for said actuating mechanism normally disconnected therefrom, a pivoted device comprising two members for connecting the actuating mechanism and the operating means, one member of said connecting device being slidably mounted upon the other member, and a manipulating device for rocking said device into connecting position.

3. In a cash register, the combination with a registering element, of actuating mechanism therefor, operating means for said actuating mechanism normally disconnected therefrom, a movable device comprising two members, one of which is movable independently of the other, a connecting device carried by the independently movable member for connecting the actuating mechanism and operating means, and a key for moving the movable device thereby carrying the connecting device into connecting position.

4. In a cash register, the combination with a registering element, of actuating mechanism therefor, operating means for said actuating mechanism normally disconnected therefrom, a pivoted device comprising two members, one of which is slidably mounted upon the other member, a connecting device carried by the slidably mounted member for connecting the actuating mechanism and operating means, and a key for rocking the pivoted device thereby carrying the connecting device into connecting position.

5. In a cash register, the combination with a registering element and actuating mechanism therefor normally out of operative relation therewith, of means for establishing an operative relation between said element and said actuating mechanism, operating means for the actuating mechanism normally disconnected therefrom, a movable device comprising two members for connecting the actuating mechanism and the operating means, one member of said connecting device being movable independently of the other, and a manipulative device for controlling the movement of said device into connecting position.

6. In a cash register, the combination with an indicator and actuating mechanism therefor positively connected thereto at all times, of operating means for the actuating mechanism normally disconnected therefrom, a movable device comprising two members for connecting the actuating mechanism and the operating means, one member of said connecting device being movable independently of the other, and a manipulative device for controlling the movement of said device into connecting position.

7. In a cash register, the combination with an indicator and actuating mechanism therefor positively connected thereto at all times, of operating means for the actuating mechanism normally disconnected therefrom, a pivoted device comprising two members for connecting the actuating mechanism and the operating means, one member of said connecting device being slidably mounted upon the other member, and a key for rocking said device into connecting position.

8. In a cash register, the combination with an indicator and actuating mechanism therefor positively connected thereto at all times, of operating means for the actuating mechanism normally disconnected therefrom, a pivoted device comprising two members for connecting the actuating mechanism and the operating means, one member of said connecting device being slidably mounted upon the other member, a key for rocking said device into connecting position, means for latching the key and thereby the pivoted device in their adjusted position, and means operated by the operating means after the indicator has been actuated to disable the latching means.

9. In a cash register, the combination with a plurality of amount indicators, of manipulative devices and intervening mechanism for controlling the movement of the indicators, clerks' indicators located above the amount indicators and near the ends of the cash register for indicating to the front and back of the machine, a pinion attached to each of the clerks' indicators, a shaft and segments carried thereby for meshing with the pinions, and additional manipulative devices and intervening mechanism for differentially rocking said shaft and thereby adjusting said clerks' indicators by the segments and pinions.

10. In a machine of the class described the combination with a plurality of special counters upon which are registered the number of special transactions entered in the machine, of a shaft supporting all of said counters, an actuating device for each counter, an operating means common to all of the actuating devices but normally out of operative relation therewith, and special keys, one for each actuating device and positively connected thereto, for establishing an operative relation between the operating means and any one of the actuating devices.

In witness whereof I have signed this specification in the presence of two witnesses.

ROBERT BRIDEN,
*Receiver in lunacy of Charles Palmer.*

Witnesses:
A. J. HADDON,
A. E. HATHAWAY.

Copies of this patent may be obtained for five cents each, by addressing the "Commissioner of Patents, Washington, D. C."